Feb. 18, 1930. W. S. BRADLEY 1,747,814
AUTOMATIC SWITCHER DEVICE FOR OIL STORAGE TANKS
Filed Oct. 3, 1927 2 Sheets-Sheet 1

William S. Bradley
INVENTOR

BY John M. Spellman
ATTORNEY

Feb. 18, 1930.  W. S. BRADLEY  1,747,814
AUTOMATIC SWITCHER DEVICE FOR OIL STORAGE TANKS
Filed Oct. 3, 1927  2 Sheets-Sheet 2
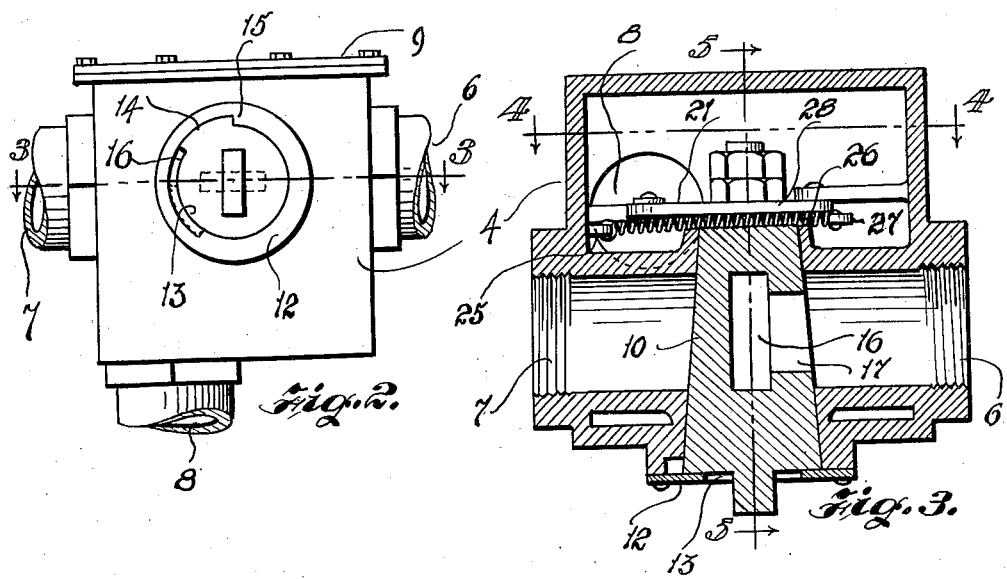
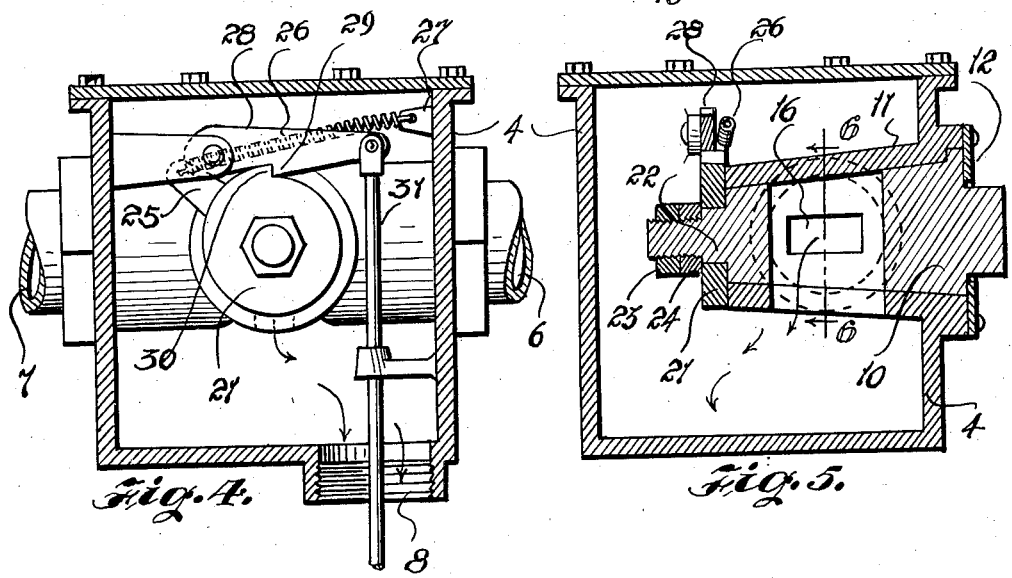
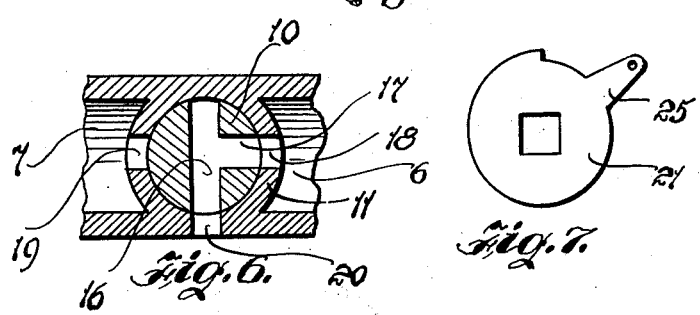
William S. Bradley
INVENTOR
BY John M. Spellman
ATTORNEY Patented Feb. 18, 1930

1,747,814

UNITED STATES PATENT OFFICE

WILLIAM S. BRADLEY, OF THRIFT, TEXAS, ASSIGNOR TO GULF PRODUCTION COMPANY, OF HOUSTON, TEXAS, A CORPORATION OF TEXAS

AUTOMATIC SWITCHER DEVICE FOR OIL-STORAGE TANKS

Application filed October 3, 1927. Serial No. 223,603.

This invention relates to oil storage tanks, but more particularly the invention has for its primary object to provide means and apparatus for controlling the flow of oil from oil wells to storage tanks.

In filling a chain or battery of oil tanks from one or several oil wells, it is necessary to divert the flow of oil from a tank which has been filled by manual or automatic means to the next tank in the flow line.

The present invention has for its principal object to provide simple automatic and positive means and apparatus whereby each tank can be filled and when so filled the oil flow automatically diverted to the next tank and so on until the complete battery or line of tanks is filled.

With the above and further minor objects in view, the invention will be clearly understood from a perusal of the following detailed description, taken in connection with the accompanying drawings forming part of this specification and wherein:

Figure 2 represents a side elevational view of a valve body housing or box containing the valve and connecting parts.

Figure 3 is a horizontal sectional view through the valve body, the view being taken on the line 3—3 of Figure 2.

Figure 4 is a transverse horizontal sectional view on the line 4—4 of Figure 3.

Figure 5 is a transverse vertical sectional view taken on the line 5—5 of Figure 3.

Figure 6 represents a vertical detail sectional view taken on the line 6—6 of Figure 5; and Figure 7 is a top plan view of a ratchet disk for closing the valve.

Figure 1:
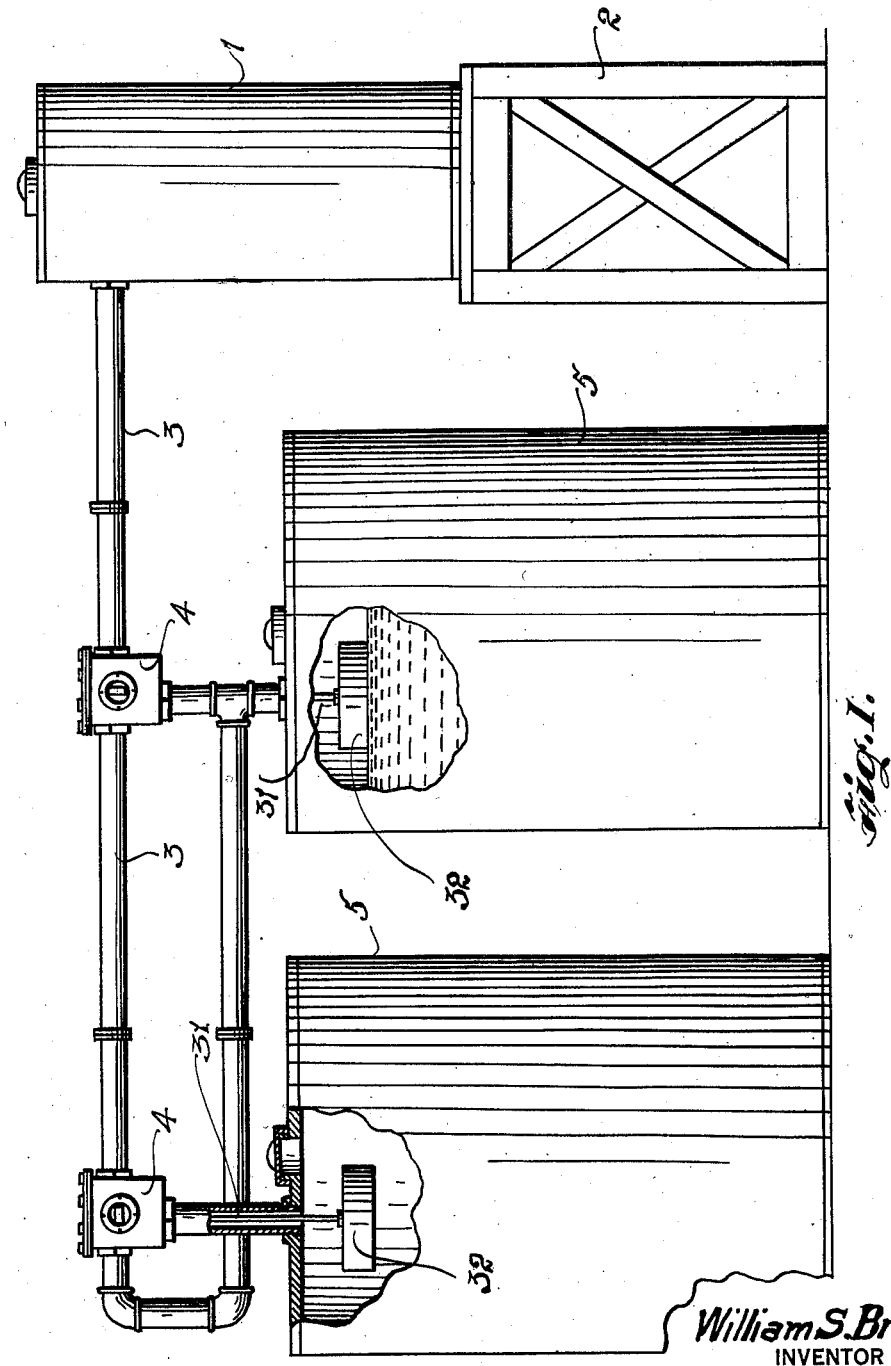
Figure 1 represents an elevational view of a tank over an oil well and connected to a plurality of tanks into which the oil is being directed.

Proceeding in accordance with the drawings and wherein different numerals denote the various parts, 1 designates a tank over an oil well derrick 2 and from which leads a flow pipe 3. The flow pipe 3 leads and is connected to the valve body 4, several of which are disposed at various intervals in the flow line, depending upon the number of tanks being filled. The storage tanks 5 may be of various forms or dimensions, those shown being merely for the purpose of illustration.

In Figures 2 to 7 inclusive are illustrated in detail the valve body, housing or box containing the valve and cooperating parts, whereby the flow of oil from a well or wells is allowed to pass from such well or wells and then automatically diverted from a filled tank to an empty tank.

The valve body 4 has an inlet port 6, an outlet port 7 from the valve body and an outlet port 8 leading from the valve body to the interior of the tank to be filled. A plate 9 forms a covering for the valve body. In the interior of the valve housing is the valve 10 of tapered form and disposed in its socket 11. The socket 11 which encloses the valve 10 is preferably formed integrally with the side wall of the valve housing 4 and projects slightly beyond said body as clearly shown in Figure 5. The socket has a cover 12 with an aperture through which the head of the valve projects. This head is formed for the reception of a wrench or other tool to set the valve in position when a tank is being filled. Also the cover 12 includes a semi-circular recess 13 and the head portion has a projection 14 which provides stops at the points 15 and 16'. These stops prevent the valve from moving too far either way in the operation thereof—all of which will be more particularly described hereinafter.

The valve proper denoted at 10 is recessed centrally at 16 and laterally at 17 and the walls of the socket 11 are also recessed at 18, 19 and 20. These latter recesses provide ports when registered with recesses 16' and 17 to permit the liquid to pass into the tank being filled in the directions of the arrows in Figures 4 and 5.

In Figures 3, 4 and 7 are shown a ratchet disk 21 which is squared to fit over the opposite end 22 of the valve. This disk is held in position by two nuts 23 and 24, the latter nut being a jam nut to prevent leakage.

On the disk 21 is formed an arm 25 to which is fastened one end of a spring 26. The opposite end of the spring is fastened to a lug 27. An arm 28 has a notch 29 which engages with a notch 30, as in Figure 4 when the tank is being filled. One end of this arm is pivoted to a rod 31, the lower end of which rod is fastened to a float 32 in the tank.

From the preceding description it will now be apparent that when the liquid in the tank raises the float high enough the rod 31 will raise the arm 28 and the spring will retract the arm 25 to rotate the valve 10 from position shown in Fig. 6 to where the recess 16 will register with recesses 18 and 19, consequently the oil will then pass through the main recess 16 in the valve, thence to the next tank to be filled.

Obviously modifications may be made in the invention in keeping with the appended claim.

What is claimed is:

In apparatus for supplying liquid to a receptacle, the combination with a valve body provided with a two-way outlet, of a valve provided with a valve stem for controlling said outlet, means for normally urging said valve from one position to another and for opening one of said ways when the other is closed, mechanism for releasably securing said valve in one position in opposition to said means, said mechanism comprising a disk secured to said valve stem and having its periphery formed with a notch therein, a flow provided with a float stem, an arm having its ends pivoted respectively to said valve body and said float stem, a lug formed on said arm intermediate the ends thereof and being movable into and out of engagement with said notch by the movement of said float controlled by the level of liquid in said receptacle.

In testimony whereof I affix my signature.

WILLIAM S. BRADLEY.